(No Model.)

P. PRICE & J. LEIB.
DEVICE FOR CONNECTING PIPE TO BORE HOLES FOR ARTESIAN WELLS.

No. 347,277. Patented Aug. 10, 1886.

WITNESSES
Phill Masi.
Ben. Frigitt.

INVENTORS
Parker Price.
John Leib.
by Audusina Smith
Attorneys

N. PETERS, Photo-Lithographer, Washington, D. C.

UNITED STATES PATENT OFFICE.

PARKER PRICE AND JOHN LEIB, OF SANDY RUN, PENNSYLVANIA.

DEVICE FOR CONNECTING PIPE TO BORE-HOLES FOR ARTESIAN WELLS.

SPECIFICATION forming part of Letters Patent No. 347,277, dated August 10, 1886.

Application filed May 15, 1886. Serial No. 202,311. (No model.)

*To all whom it may concern:*

Be it known that we, PARKER PRICE and JOHN LEIB, citizens of the United States, residing at Sandy Run, in the county of Luzerne and State of Pennsylvania, have invented certain new and useful Improvements in Devices for Connecting Pipe to Bore-Holes for Artesian Wells; and we do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
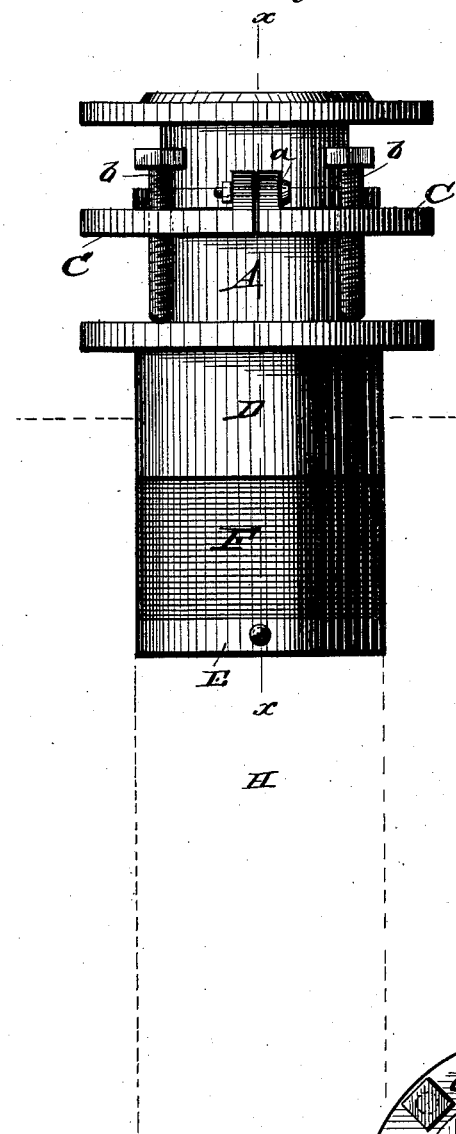
Figure 2:
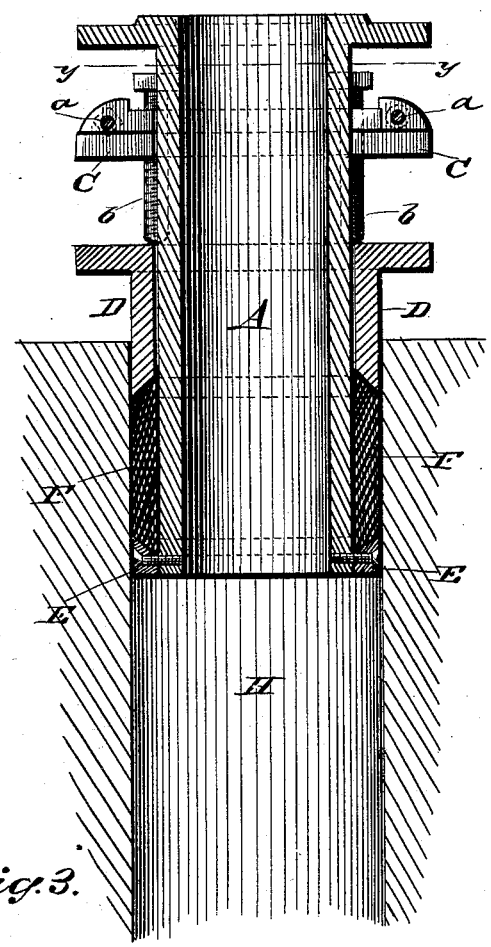
Figure 3:
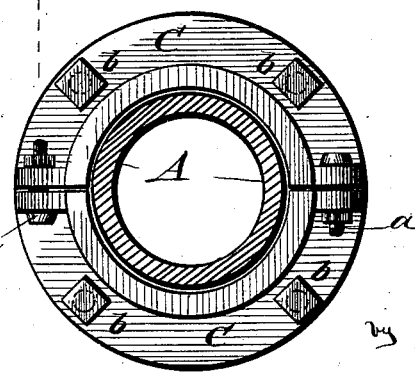

Figure 1 of the drawings is a representation of a side elevation. Fig. 2 is a vertical section on line $x\,x$, Fig. 1. Fig. 3 is a horizontal section on line $y\,y$, Fig. 2.

Our invention relates to devices for connecting pipe to bore-holes; and it consists in the construction and novel combination of parts, as hereinafter described, and pointed out in the claim.

Referring by letter to the accompanying drawings, A designates the pipe, of suitable length, with a movable gland, D, attached thereto.

E designates a collar, which is either shrunk or screwed onto the end of the pipe A, and this collar E is of the same diameter as the bore-hole H, so that the packing F may be held in place when forced down by the gland D.

The clamp C is made in two halves, which are bolted tight to the pipe A by bolts $a\,a$. Four set-screws, $b\,b\,b\,b$, are employed to force the gland D down on the packing F, which closes the bore-hole H around the pipe A and prevents any leakage.

The object of this device is to save the expense of tubing the bore-hole, and may be made of any size, from one inch to six feet in diameter, to suit the size of the bore-hole; and it prevents water or anything else from either entering the hole at the top or coming out of the hole from the bottom, except through the pipe A itself. It is intended that nothing whatever shall pass the packing F.

Having described this invention, what we claim, and desire to secure by Letters Patent, is—

The combination, with the pipe, of the movable gland, the collar shrunk or screwed on the end of the pipe, the sectional clamp secured to the pipe by bolts, the four headed set-screws in the sectional clamp, and the packing around the pipe below the movable gland, substantially as specified.

In testimony whereof we affix our signatures in presence of two witnesses.

PARKER PRICE.
JOHN LEIB.

Witnesses:
GEORGE COOK,
CHAS. T. TOMBLER.